(12) United States Patent
Jezewski

(10) Patent No.: US 11,861,477 B2
(45) Date of Patent: *Jan. 2, 2024

(54) UTILIZING MACHINE LEARNING MODELS TO IDENTIFY INSIGHTS IN A DOCUMENT

(71) Applicant: Capital One Services, LLC, McLean, VA (US)

(72) Inventor: Joni Bridget Jezewski, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,187

(22) Filed: Jan. 6, 2022

(65) Prior Publication Data

US 2022/0129641 A1    Apr. 28, 2022

Related U.S. Application Data

(63) Continuation of application No. 16/693,650, filed on Nov. 25, 2019, now Pat. No. 11,227,121, which is a
(Continued)

(51) Int. Cl.
*G06F 16/58*     (2019.01)
*G06N 20/20*     (2019.01)
*G06N 3/04*      (2023.01)
*G06N 20/00*     (2019.01)
*G06F 16/30*     (2019.01)
(Continued)

(52) U.S. Cl.
CPC ............. *G06N 20/20* (2019.01); *G06F 16/30* (2019.01); *G06F 18/24* (2023.01); *G06F 18/2413* (2023.01); *G06F 40/216* (2020.01); *G06F 40/284* (2020.01); *G06F 40/30* (2020.01);
(Continued)

(58) Field of Classification Search
CPC ...... G06F 40/30; G06F 40/20; G06F 16/3344; G06F 40/205; G06F 40/284; G06F 40/289; G06F 40/211
See application file for complete search history.

(56) References Cited

U.S. PATENT DOCUMENTS 4,868,733 A    9/1989    Fujisawa et al.
5,887,120 A    3/1999    Wical et al.
(Continued)

*Primary Examiner* — Olujimi A Adesanya
(74) *Attorney, Agent, or Firm* — Harrity & Harrity, LLP

(57) ABSTRACT

A device receives document information associated with a document, and receives a request to identify insights in the document information. The device performs, based on the request, natural language processing on the document information to identify words, phrases, and sentences in the document information, and utilizes a first machine learning model with the words, the phrases, and the sentences to identify information indicating abstract insights, concrete insights, and non-insights in the document. The device utilizes a second machine learning model to match the abstract insights with particular concrete insights that are different than the concrete insights, and utilizes a third machine learning model to determine particular insights based on the non-insights. The device generates an insight document that includes the concrete insights, the abstract insights matched with the particular concrete insights, and the particular insights determined based on the non-insights.

20 Claims, 10 Drawing Sheets

Related U.S. Application Data continuation of application No. 16/385,496, filed on Apr. 16, 2019, now Pat. No. 10,489,512, which is a continuation of application No. 15/896,922, filed on Feb. 14, 2018, now Pat. No. 10,303,771.

(51) Int. Cl.

| | | |
|---|---|---|
| *G06F 40/30* | (2020.01) | |
| *G06F 40/216* | (2020.01) | |
| *G06F 40/284* | (2020.01) | |
| *G06V 30/40* | (2022.01) | |
| *G06F 18/24* | (2023.01) | |
| *G06F 18/2413* | (2023.01) | |

(52) U.S. Cl.
CPC ............... *G06N 3/04* (2013.01); *G06N 20/00* (2019.01); *G06V 30/40* (2022.01)

(56) References Cited

U.S. PATENT DOCUMENTS

| | | |
|---|---|---|
| 5,918,236 A | 6/1999 | Wical et al. |
| 5,937,400 A | 8/1999 | Au et al. |
| 5,987,460 A | 11/1999 | Niwa et al. |
| 6,112,201 A | 8/2000 | Wical et al. |
| 6,167,368 A | 12/2000 | Wacholder et al. |
| 6,192,360 B1 | 2/2001 | Dumais et al. |
| 6,772,149 B1 | 8/2004 | Morelock et al. |
| 7,689,546 B2 | 3/2010 | Miller et al. |
| 7,849,081 B1 | 12/2010 | Chang et al. |
| 8,589,413 B1 | 11/2013 | Mohan et al. |
| 9,047,283 B1 | 6/2015 | Zhang et al. |
| 9,098,570 B2 | 8/2015 | Zhang et al. |
| 9,336,192 B1 | 5/2016 | Barba et al. |
| 9,785,696 B1 | 10/2017 | Yakhnenko et al. |
| 10,303,771 B1 | 5/2019 | Jezewski |
| 10,360,631 B1 | 7/2019 | Jezewski |
| 10,489,512 B2 | 11/2019 | Jezewski |
| 11,227,121 B2 | 1/2022 | Jezewski |
| 2006/0184516 A1 | 8/2006 | Ellis et al. |
| 2008/0027888 A1* | 1/2008 | Azzam .................... G06F 40/30 |
| | | 706/45 |
| 2010/0083105 A1 | 4/2010 | Channabasavaiah et al. |
| 2010/0228693 A1 | 9/2010 | Dawson et al. |
| 2010/0281025 A1 | 11/2010 | Tsatsou et al. |
| 2012/0254333 A1 | 10/2012 | Chandramouli et al. |
| 2013/0081056 A1 | 3/2013 | Hu et al. |
| 2014/0222834 A1 | 8/2014 | Parikh et al. |
| 2014/0258927 A1* | 9/2014 | Rana ....................... G06F 16/58 |
| | | 715/810 |
| 2015/0046151 A1 | 2/2015 | Lane et al. |
| 2015/0100562 A1 | 4/2015 | Kohlmeier et al. |
| 2015/0154193 A1 | 6/2015 | Dave et al. |
| 2015/0178272 A1 | 6/2015 | Geigel |
| 2015/0199380 A1 | 7/2015 | Avramova et al. |
| 2015/0317367 A1* | 11/2015 | Zhao ................. G06F 16/24575 |
| | | 707/706 |
| 2016/0048768 A1 | 2/2016 | Liu et al. |
| 2016/0140210 A1 | 5/2016 | Pendyala et al. |
| 2016/0275180 A1* | 9/2016 | Matskevich ............ G06F 16/93 |
| 2016/0350664 A1 | 12/2016 | Devarajan et al. |
| 2017/0060555 A1* | 3/2017 | Allen ........................ G06F 8/34 |
| 2017/0083507 A1 | 3/2017 | Ho et al. |
| 2017/0132288 A1* | 5/2017 | Ho .......................... G06F 40/30 |
| 2017/0132730 A1* | 5/2017 | Takuma ................. G06F 16/26 |
| 2017/0249389 A1 | 8/2017 | Brovinsky et al. |
| 2018/0032608 A1 | 2/2018 | Wu et al. |
| 2018/0039889 A1* | 2/2018 | Nanavati ............... G06F 16/387 |
| 2018/0150459 A1 | 5/2018 | Farid et al. |
| 2019/0236135 A1 | 8/2019 | Tyamagondlu Nagabhushan |
| 2020/0293873 A1 | 9/2020 | Dai et al. |

\* cited by examiner

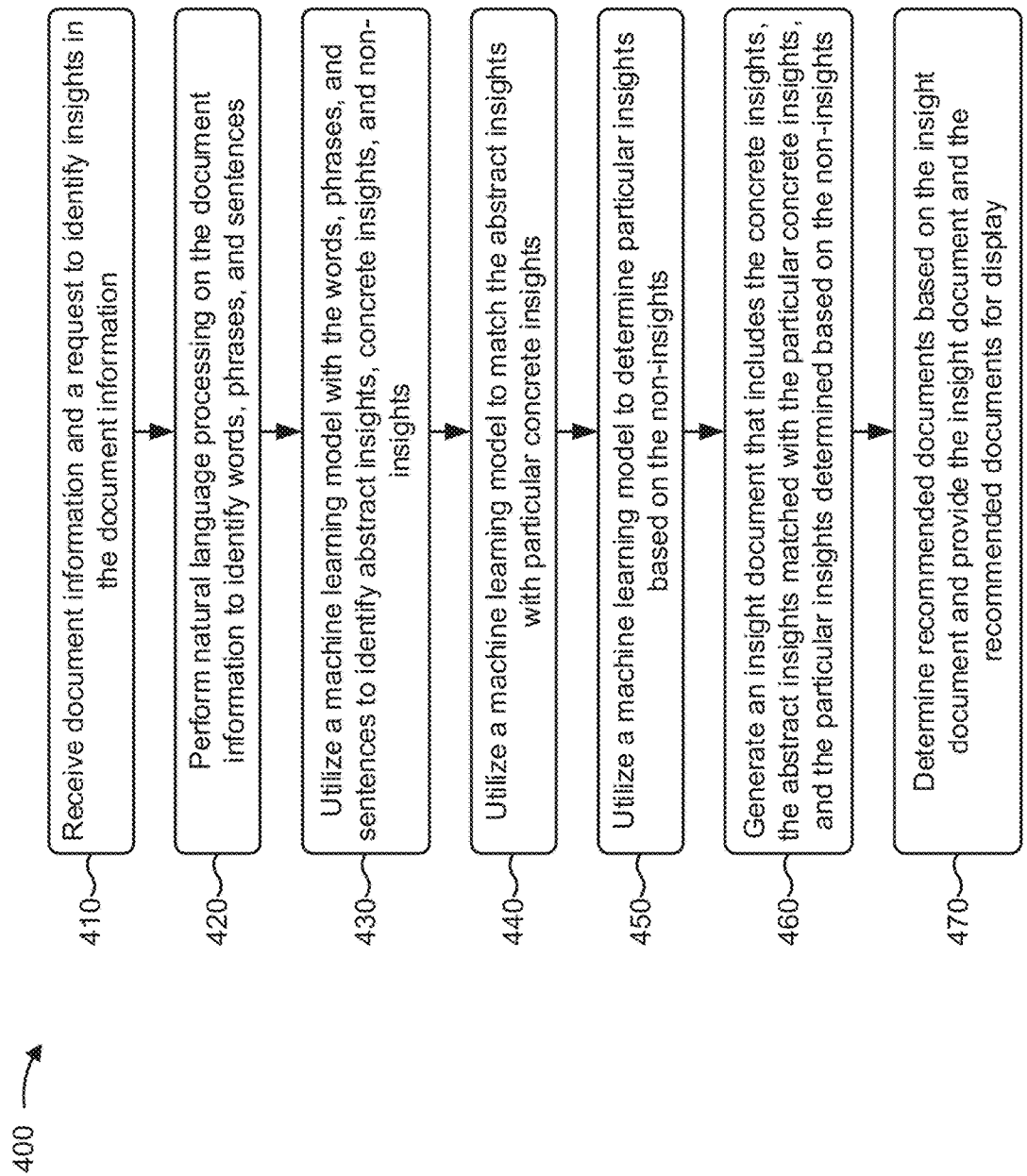

UTILIZING MACHINE LEARNING MODELS TO IDENTIFY INSIGHTS IN A DOCUMENT

RELATED APPLICATIONS

This application is a continuation of U.S. patent application Ser. No. 16/693,650, filed Nov. 25, 20219 (now U.S. Pat. No. 11,227,121), which is a continuation of U.S. patent application Ser. No. 16/385,496, filed Apr. 16, 2019 (now U.S. Pat. No. 10,489,512), which is a continuation of U.S. patent application Ser. No. 15/896,922, filed Feb. 14, 2018 (now U.S. Pat. No. 10,303,771), the contents of which are incorporated herein by reference in their entireties.

BACKGROUND

Users of client devices may access a variety of documents, such as a website, web pages, an e-mail, a business listing, a news group posting, a blog, an article, an electronic book (e-book), and/or the like. At times, the users have enough time to review an entire document, or the document is short enough in length for the users to review the entire document.

SUMMARY

According to some implementations, a device may include one or more memories, and one or more processors, communicatively coupled to the one or more memories, configured to receive document information associated with a document to be displayed by a client device, and receive, from the client device, a request to identify insights in the document information. The one or more processors may be configured to perform, based on the request, natural language processing on the document information to identify words, phrases, and sentences in the document information, and utilize a first machine learning model with the words, the phrases, and the sentences to identify information indicating abstract insights, concrete insights, and non-insights in the document. The one or more processors may be configured to utilize a second machine learning model to match the abstract insights with particular concrete insights that are different than the concrete insights, and utilize a third machine learning model to determine particular insights based on the non-insights. The one or more processors may be configured to generate an insight document that includes information indicating the concrete insights, the abstract insights matched with the particular concrete insights, and the particular insights determined based on the non-insights, and provide the insight document, for display, to the client device.

According to some implementations, a method may include receiving, by a device, document information associated with a document to be displayed by a client device, and receiving, by the device and from the client device, a request to identify insights in the document information. The method may include performing, by the device and based on the request, natural language processing on the document information to identify words, phrases, and sentences in the document information, and filtering, by the device, some words and phrases from the words and the phrases to generate filtered words and filtered phrases. The method may include utilizing, by the device, a first machine learning model with the filtered words, the filtered phrases, and the sentences to identify information indicating concepts in the document, and utilizing by the device, a second machine learning model with the information indicating the concepts in the document to identify information indicating abstract insights, concrete insights, and non-insights in the document. The method may include utilizing, by the device, a third machine learning model to match the abstract insights with particular concrete insights that are different than the concrete insights, and utilizing, by the device, a fourth machine learning model to determine particular insights based on the non-insights. The method may include generating, by the device, an insight document that includes information indicating the concrete insights, the abstract insights matched with the particular concrete insights, and the particular insights determined based on the non-insights, and providing, by the device, the insight document, for display, to the client device.

According to some implementations, a non-transitory computer-readable medium may store instructions that include one or more instructions that, when executed by one or more processors of a device, cause the one or more processors to receive, from a client device, a request to identify insights in document information associated with a document to be displayed by the client device, and perform, based on the request, natural language processing on the document information to identify words, phrases, and sentences in the document information, The one or more instructions may cause the one or more processors to utilize a first machine learning model with the words, the phrases, and the sentences to identify information indicating abstract insights, concrete insights, and non-insights in the document, and utilize a second machine learning model to match the abstract insights with particular concrete insights that are different than the concrete insights. The one or more instructions may cause the one or more processors to utilize a third machine learning model to determine particular insights based on the non-insights, and generate an insight document that includes information indicating the concrete insights, the abstract insights matched with the particular concrete insights, and the particular insights determined based on the non-insights. The one or more instructions may cause the one or more processors to determine one or more recommended documents based on the insight document, and provide the insight document and information indicating the one or more recommended documents, for display, to the client device.

BRIEF DESCRIPTION OF THE DRAWINGS

FIG. 4 is a flow chart of an example process for utilizing machine learning models to identify insights in a document.

DETAILED DESCRIPTION

Figure 1A:
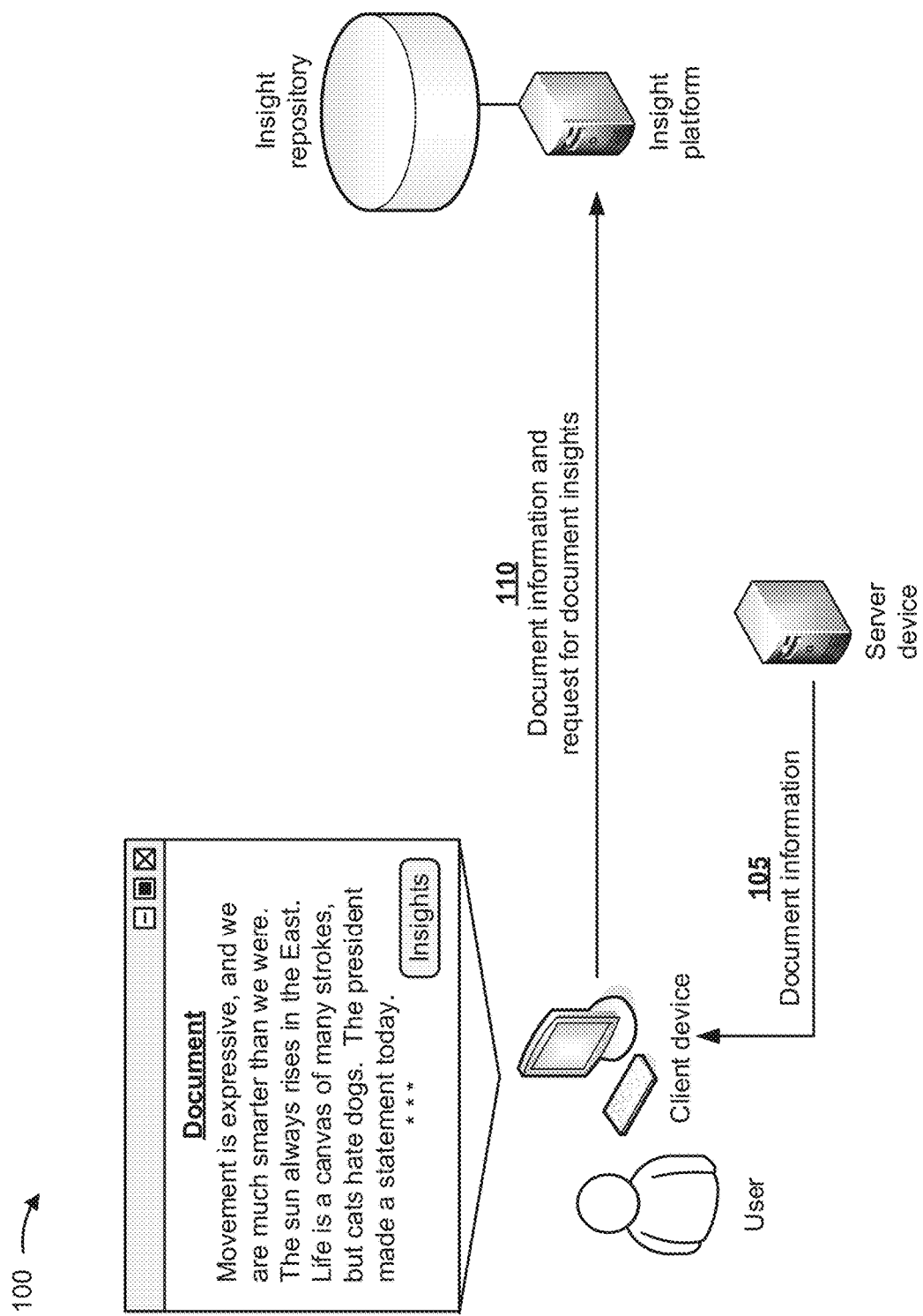
FIGS. 1A-1G are diagrams of an overview of an example implementation described herein.

The following detailed description of example implementations refers to the accompanying drawings. The same reference numbers in different drawings may identify the same or similar elements.

Many times when users access a document, the users do not have enough time to review the entire document, or the document may be too long to review entirely. In such instances, the users may wish to review information (e.g., insights) that provide links between concepts provided in the document. However, there are currently no systems that automatically highlight insights in a document for quick and easy review of the document.

Some implementations described herein may provide an insight platform that utilizes machine learning models to identify insights in a document. For example, the insight platform may receive document information associated with a document, and may receive a request to identify insights in the document information. The insight platform may perform natural language processing on the document information to identify words, phrases, and sentences, and may utilize a first machine learning model with the words, the phrases, and the sentences to identify abstract insights, concrete insights, and non-insights. The insight platform may utilize a second machine learning model to match the abstract insights with particular concrete insights, and may utilize a third machine learning model to determine particular insights based on the non-insights. The insight platform may generate an insight document that includes the concrete insights, the abstract insights matched with the particular concrete insights, and the particular insights determined based on the non-insights. The insight platform may determine recommended documents based on the insight document, and may provide the insight document and the recommended documents for display.

The term document, as used herein, is to be broadly interpreted to include any machine-readable and machine-storable work product. A document may include, for example, a web page, an e-mail, a business listing, a file, a combination of files, one or more files with embedded links to other files, a news group posting, a blog, an e-book, and/or the like. In the context of the Internet, a common document is a web page. A document may include textual information, embedded information, such as meta information, images, hyperlinks, and/or the like, and/or embedded instructions, such as Javascript. In some implementations, metadata (e.g., face tags, computer vision labels, and other types of metadata) may relate to, be derived, and/or be associated with a document.

The term insight, as used herein, is to be broadly interpreted to include any information in a document that provides links between concepts provided in the document, information in the document that provides an understanding of a true nature of the document, and/or the like.

The term concept, as used herein, is to be broadly interpreted to include a general notion or idea provided in the document, an idea of something formed by combining the characteristics or particulars provided in the document (e.g., a construct), and/or the like.

FIGS. 1A-1G are diagrams of an overview of an example implementation 100 described herein. As shown in FIG. 1A, a user may be associated with a client device, a server device, and an insight platform. Assume that the user wishes to utilize the client device to access a document provided by the server device. As further shown in FIG. 1A, and by reference number 105, the server device may provide document information to the client device. In some implementations, the document information may include information associated with the document, such as textual information provided in the document, information indicating locations of the document at the server device (e.g., uniform resource locators (URLs)), information indicating folders storing information associated with the document in the server device, information indicating files associated with the document that are stored in the server device, and/or the like.

As further shown in FIG. 1A, the client device may receive the document information, and may provide a user interface (e.g., a web browser) that displays the document information to the user. As further shown, the user interface may include a mechanism (e.g., a button, a link, a browser plugin, and/or the like) which, when selected, may cause the client device to generate a request to identify insights in the document information (e.g., document insights). As further shown in FIG. 1A, and by reference number 110, if the user selects the mechanism, the client device may provide, to the insight platform, the document information and the request to identify the document insights. The insight platform may receive the document information and the request to identify the document insights.

Figure 1B:
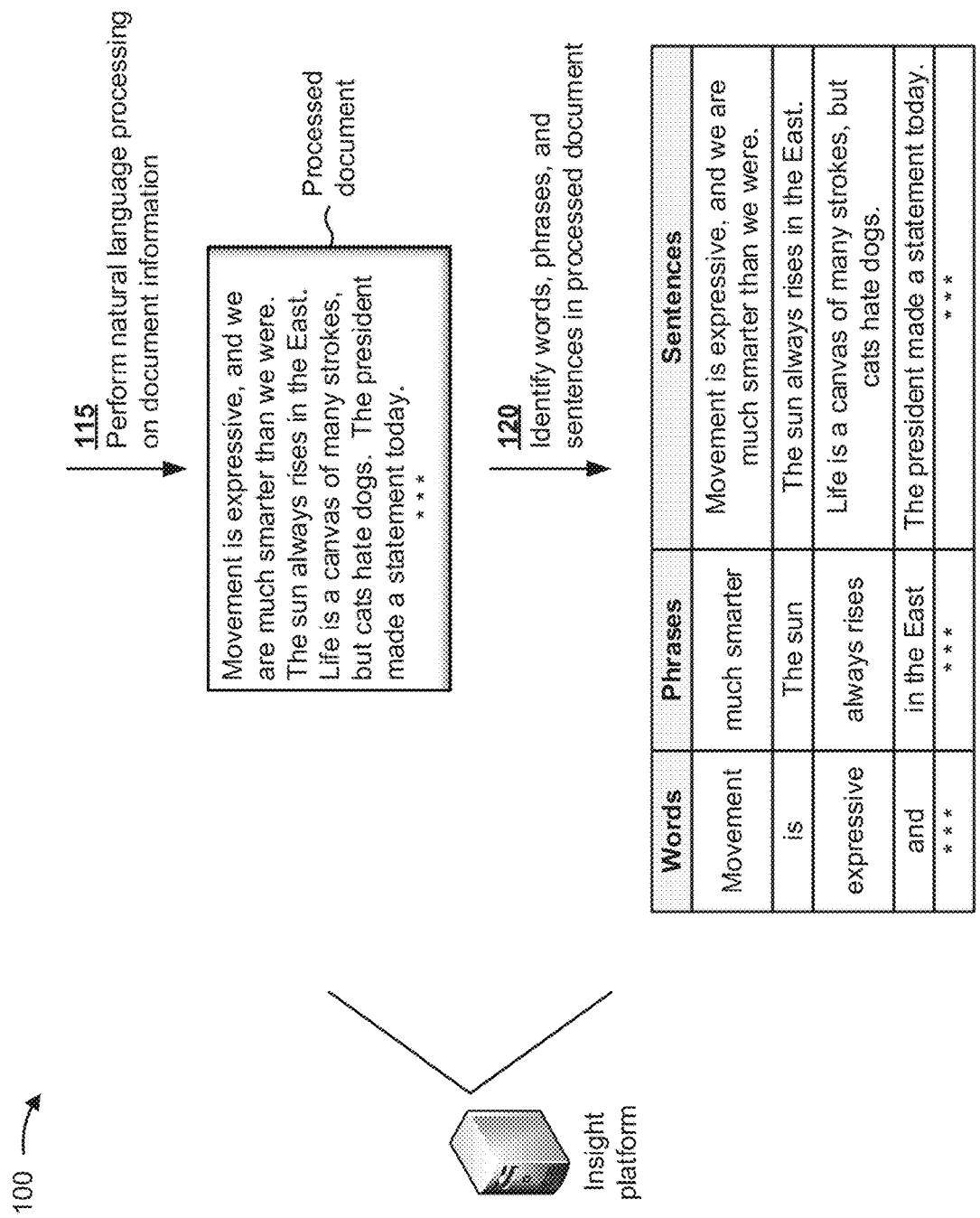

As shown in FIG. 1B, and by reference number 115, the insight platform may perform a natural language processing technique on the document information in order to generate a processed document. In some implementations, the natural language processing technique utilizes computing resources to analyze, understand, and derive meaning from the document information in a useful way. In some implementations, rather than treating the document information as a mere sequence of symbols, the natural language processing technique may consider a hierarchical structure of language (e.g., several words can be treated as a phrase, several phrases can be treated as a sentence, and the words, phrases, and/or sentences convey ideas that can be interpreted) in the document information. In some implementations, the natural language processing technique may analyze the document information in order to perform functions, such as automatic text summarization, sentiment analysis, topic extraction, named entity recognition, parts-of-speech tagging, relationship extraction, stemming, and/or the like. In some implementations, the natural language processing technique may convert the machine-readable and machine-storable form of the document information into a language form (e.g., the processed document) that includes recognizable words, phrases, sentences, and/or the like.

As further shown in FIG. 1B, and by reference number 120, the insight platform may identify words, phrases, and sentences in the processed document based on the natural language processing technique. For example, the insight platform may identify words (e.g., "Movement," "is," "expressive," "and," etc.), phrases (e.g., "much smarter," "The sun, always rises, in the East," etc.), and sentences (e.g., "Movement is expressive, and we are much smarter than we were," "The sun always rises in the East," "Life is a canvas of many strokes, but cats hate dogs," "The president made a statement today," etc.) in the processed document.

Figure 1C:
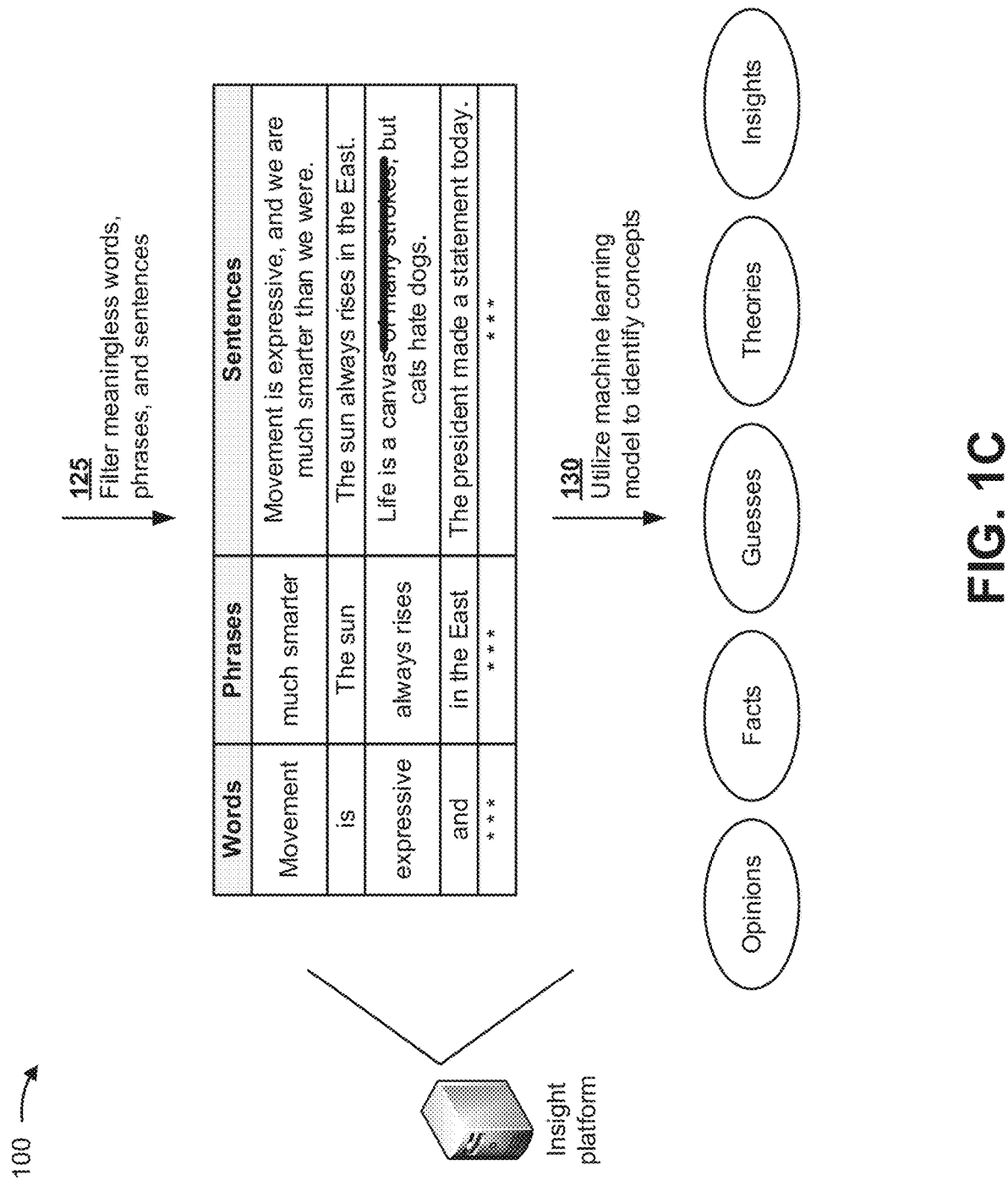

As shown in FIG. 1C, and by reference number 125, the insight platform may filter meaningless words, phrases, and/or sentences from the identified words, phrases, and sentences. In some implementations, the insight platform may determine whether a particular word, a particular phrase, or a particular sentence is relevant to remaining words, phrases, and sentences, and may filter (e.g., delete) the particular word, the particular phrase, or the particular sentence when the particular word, the particular phrase, or the particular sentence is not relevant to the remaining words, phrases, and sentences. For example, if a particular percentage of the words, phrases, and sentences relate to a particular concept or topic, the insight platform may determine whether the particular word, the particular phrase, or the particular sentence relates to the particular concept. The insight platform may delete the particular word, the particular phrase, or the particular sentence when the particular word, the particular phrase, or the particular sentence does not relate to the particular concept. As shown in FIG. 1C, the insight platform may determine that the phrase "of many strokes" is a meaningless phrase, and may delete the phrase "of many strokes" from the identified words, phrases, and sentences.

In some implementations, the insight platform may utilize a data cleansing method to filter meaningless words, phrases, and/or sentences from the identified words, phrases, and sentences. The data cleansing method may include detecting the meaningless words, phrases, and/or sentences, and then deleting the meaningless words, phrases, and/or sentences. The data cleansing method may detect and delete meaningless words, phrases, and/or sentences caused by user entry errors, by corruption in transmission or storage, by natural language processing errors, and/or the like.

As further shown in FIG. 1C, and by reference number 130, the insight platform may utilize a machine learning model, with the identified words, phrases, and sentences, to identify concepts in the identified words, phrases, and sentences. In some implementations, the concepts may include one or more of opinions, facts, guesses, theories, satire, insights, and/or the like. The opinions may include views, judgments, or appraisals about a particular matter, beliefs stronger than impressions and less strong than positive knowledge, formal expressions of judgments or advice, and/or the like. The facts may include information about things that have actual existences, pieces of information having objective reality, and/or the like. The guesses may include opinions that are based on probability or that are formed in the absence of evidence, and/or the like. The theories may include a group of tested general propositions, commonly regarded as correct, that can be used as principles of explanation and prediction for a class of phenomena, proposed explanations whose status are still conjectural and subject to experimentation, and/or the like. The satire may include information in a document that uses humor, irony, exaggeration, ridicule, and/or the like to expose and criticize stupidity or vices, particularly in a context of contemporary politics and/or other topical issues. The insights may include any information in a document that provides links between concepts provided in the document, information in the document that provides an understanding of a true nature of the document, and/or the like.

In some implementations, the machine learning model, used to identify the concepts, may include a supervised machine learning model (e.g., a decision tree learning model, a learning classifier systems model, a nearest neighbor model, a support vector machine model, and/or the like), an unsupervised machine learning model (e.g., a clustering model, a neural network model, a latent variable model, and/or the like), or a combination of the aforementioned, described elsewhere herein.

Figure 1D:
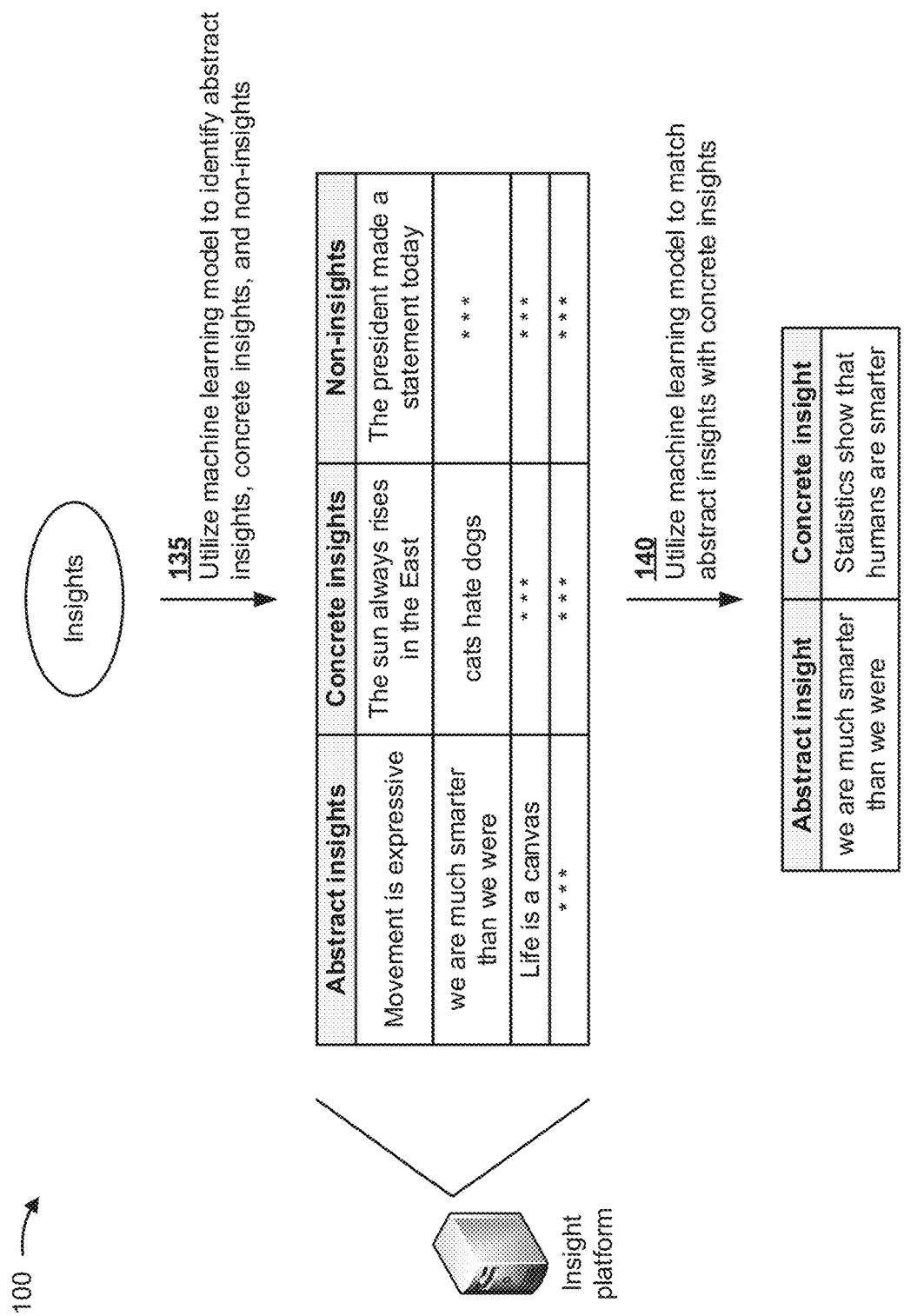

As shown in FIG. 1D, and by reference number 135, the insight platform may utilize a machine learning model to analyze the identified insights, to identify abstract insights, concrete insights, and non-insights in the identified insights. For example, as shown in FIG. 1D, the insight platform may determine that "Movement is expressive" "we are much smarter than we were" and "Life is a canvas" are abstract insights, that "The sun always rises in the East" and "cats hate dogs" are concrete insights, and that "The president made a statement today" is a non-insight.

The abstract insights may include insights that are not based on realities, specific objects, or actual instances, insights that express qualities or characteristics apart from specific objects or instances, theoretical insights, and/or the like. The concrete insights may include insights that are based on realities, specific objects, or actual instances, insights pertaining to realities or actual instances, insights applied to actual substances or things, and/or the like. The non-insights may include one or more of the opinions, the facts, the guesses, or the theories described above.

In some implementations, the machine learning model used to identify abstract insights, concrete insights, and non-insights may include a supervised machine learning model (e.g., a decision tree learning model, a learning classifier systems model, a nearest neighbor model, a support vector machine model, and/or the like), an unsupervised machine learning model (e.g., a clustering model, a neural network model, a latent variable model, and/or the like), or a combination of the aforementioned.

As further shown in FIG. 1D, and by reference number 140, the insight platform may utilize a machine learning model to match the abstract insights with particular concrete insights. In some implementations, the particular concrete insights are different than the concrete insights determined from the insights identified in the processed document. In such implementations, the insight platform may be associated with a repository that includes concrete insights related to a variety of concepts. The insight platform may utilize the machine learning model to compare the abstract insights with the concrete insights provided in the repository, and to match the abstract insights with the particular concrete insights provided in the repository. For example, the insight platform may utilize the machine learning model to match an abstract insight (e.g., "we are much smarter than we were") with a particular concrete insight (e.g., "Statistics show that humans are smarter").

In some implementations, the machine learning model used to match the abstract insights with the particular concrete insights may include a supervised machine learning model (e.g., a decision tree learning model, a learning classifier systems model, a nearest neighbor model, a support vector machine model, and/or the like), an unsupervised machine learning model (e.g., a clustering model, a neural network model, a latent variable model, and/or the like), or a combination of the aforementioned.

Figure 1E:
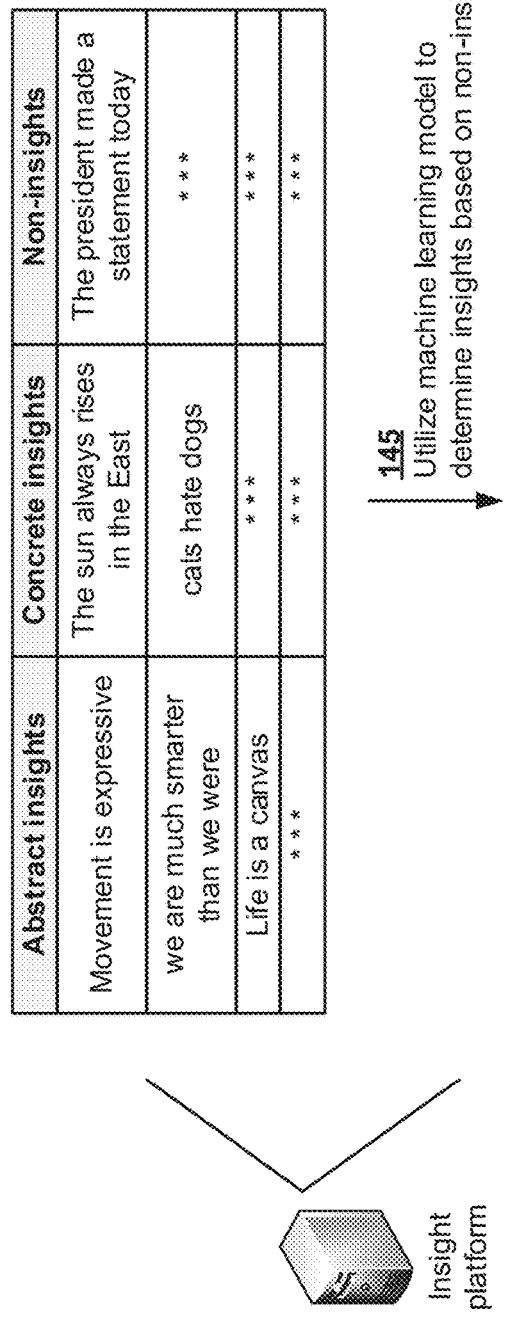

As shown in FIG. 1E, and by reference number 145, the insight platform may utilize a machine learning model to determine particular insights based on the non-insights. In some implementations, the particular insights are different than the insights identified in the processed document. In such implementations, the insight platform may be associated with a repository that includes insights related to a variety of concepts. The insight platform may utilize the machine learning model to compare the non-insights with the insights provided in the repository, and to match the non-insights with the particular insights provided in the repository. For example, the insight platform may utilize the machine learning model to match a non-insight (e.g., "The president made a statement today") with a particular insight (e.g., "Real leaders are confident").

In some implementations, the machine learning model used to determine the particular insights based on the non-insights may include a supervised machine learning model (e.g., a decision tree learning model, a learning classifier systems model, a nearest neighbor model, a support vector machine model, and/or the like), an unsupervised machine learning model (e.g., a clustering model, a neural network model, a latent variable model, and/or the like), or a combination of the aforementioned.

Figure 1F:
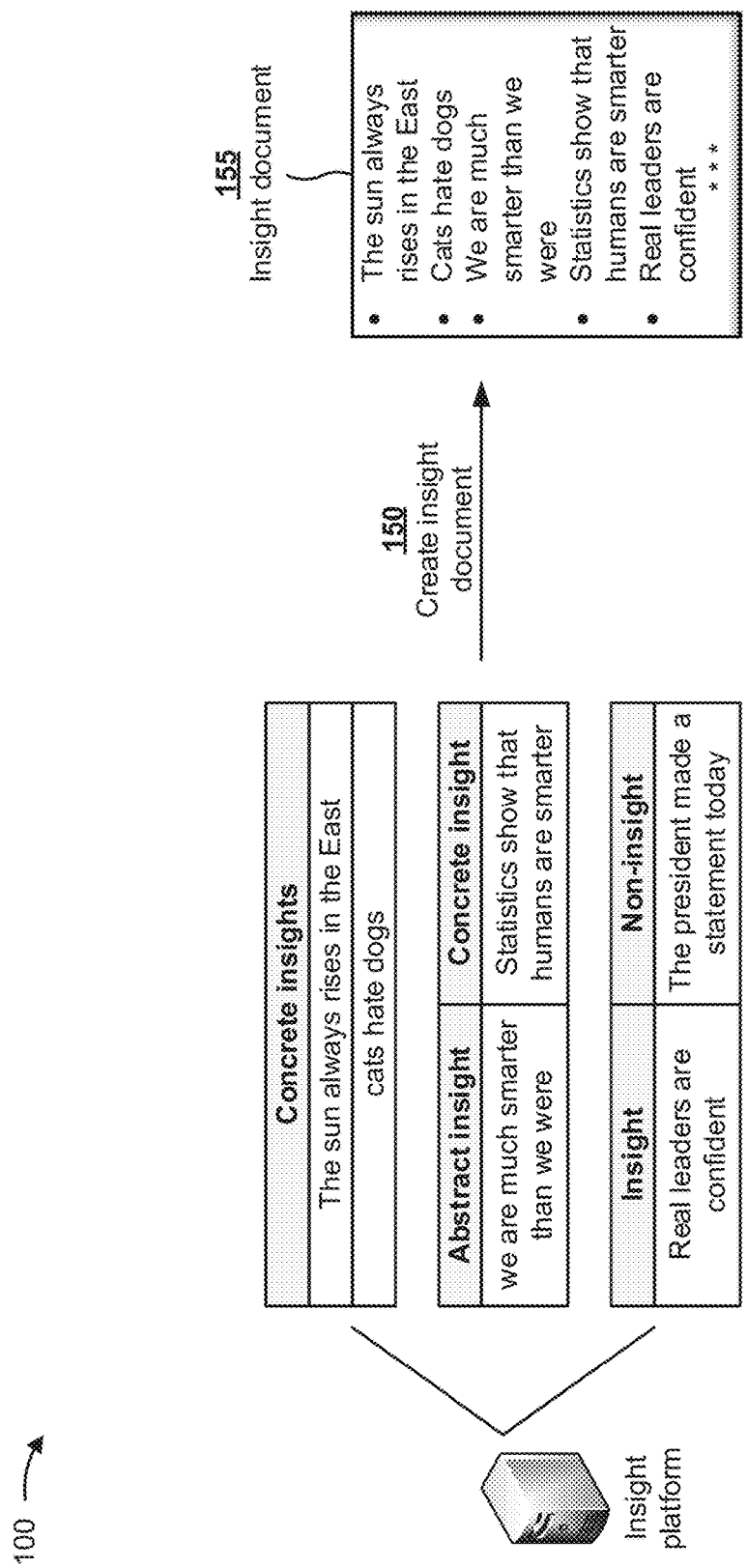

As shown in FIG. 1F, and by reference numbers 150 and 155, the insight platform may create an insight document (e.g., a new document different than the original document) based on the concrete insights, the abstract insights matched with the particular concrete insights, and the particular insights determined based on the non-insights. In some implementations, the insight platform may combine the concrete insights, the abstract insights matched with the particular concrete insights, and the particular insights determined based on the non-insights in a particular manner in order to generate the insight document. For example, the insight platform may combine the concrete insights, the abstract insights matched with the particular concrete insights, and the particular insights determined based on the non-insights in a manner such that the concrete insights, the abstract insights matched with the particular concrete insights, and the particular insights determined based on the non-insights, that are related to a particular concept, are grouped together in the insight document.

As further shown in FIG. 1F, the insight document may include the concrete insights (e.g., "The sun always rises in the East" and "Cats hate dogs"), the abstract insights (e.g., "We are much smarter than we were") matched with the particular concrete insights (e.g., "Statistics show that humans are smarter"), and the particular insights (e.g., "Real leaders are confident") determined based on the non-insights.

Figure 1G:
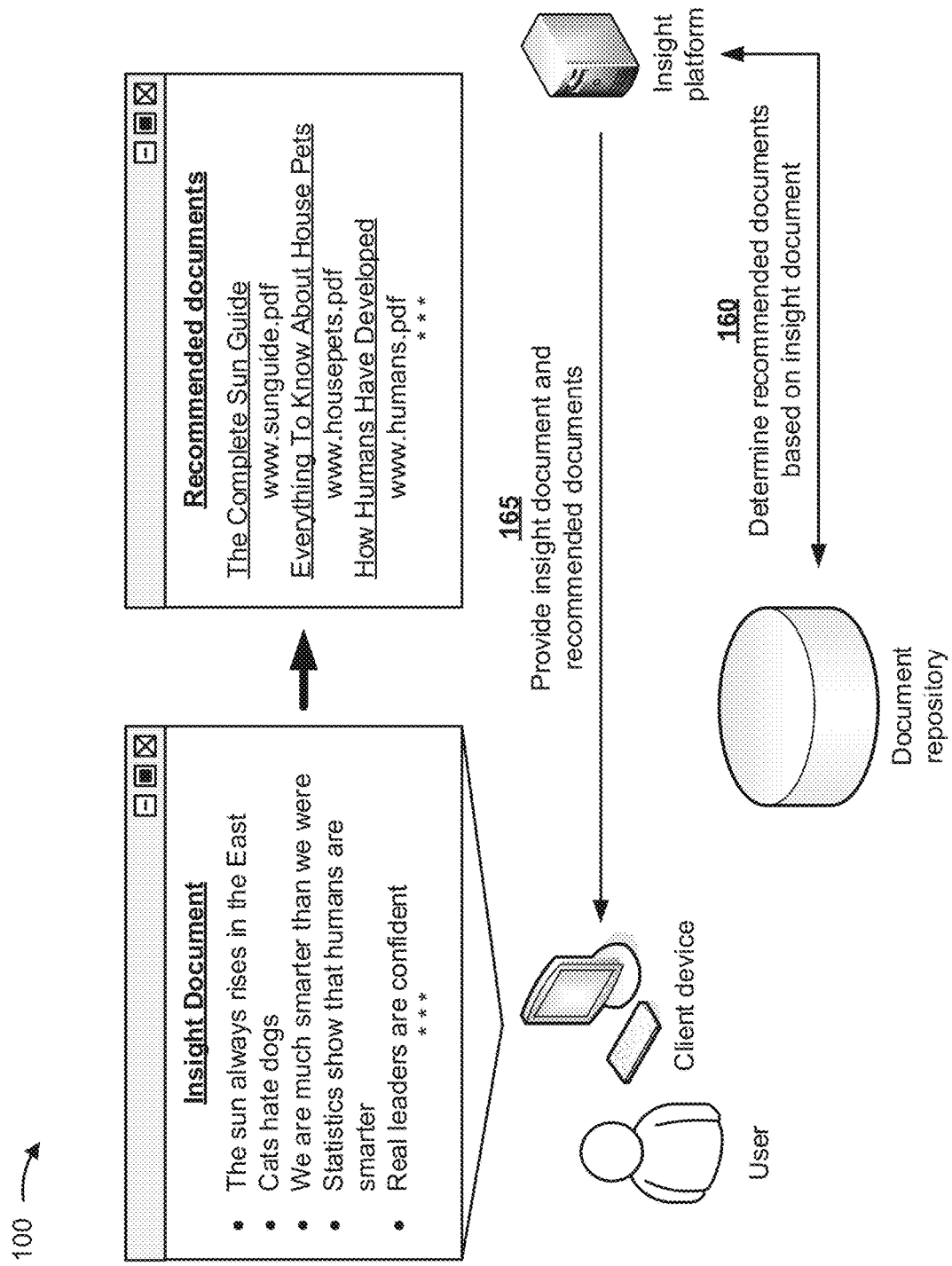

As shown in FIG. 1G, and by reference number 160, the insight platform may determine recommended documents based on the insight document. In some implementations, the insight platform may be associated with a document repository that includes documents related to a variety of concepts. In such implementations, the insight platform may compare the information provided in the insight document with the documents provided in the document repository, and may match the information provided in the insight document with particular documents (e.g., recommended documents) provided in the document repository. For example, the insight platform may match the information provided in the insight document (e.g., "The sun always rises in the East," "Cats hate dogs," "We are much smarter than we were," and "Statistics show that humans are smarter") with particular documents (e.g., "The Complete Sun Guide," "Everything To Know About House Pets," and "How Humans Have Developed," respectively) provided in the document repository.

As further shown in FIG. 1G, and by reference number 165, the insight platform may provide the insight document and information identifying the recommended documents to the client device. The client device may receive the insight document, and may provide the insight document for display to the user via a user interface. The client device may receive the information identifying the recommended documents, and may provide the information identifying the recommended documents for display to the user via the user interface providing the insight document, or via a separate user interface.

In this way, the insight platform may utilize machine learning models to quickly identify and display insights in a document, which may improve speed and efficiency associated with identifying insights in the document and with reviewing the document, and may conserve computing resources (e.g., processors, memory, and/or the like). Furthermore, implementations described herein use a computerized process to perform tasks or roles that were not previously performed or were previously performed using subjective human intuition or input. For example, prior solutions are unable to identify insights in a document so that a reader of the document can quickly and easily review the insights. Finally, utilizing machine learning models to quickly identify and display insights in a document conserves computing resources (e.g., processors, memory, and/or the like) that would otherwise be wasted in unsuccessfully attempting to identify insights in the document.

As indicated above, FIGS. 1A-1G are provided merely as examples. Other examples are possible and may differ from what was described with regard to FIGS. 1A-1G.

Figure 2:
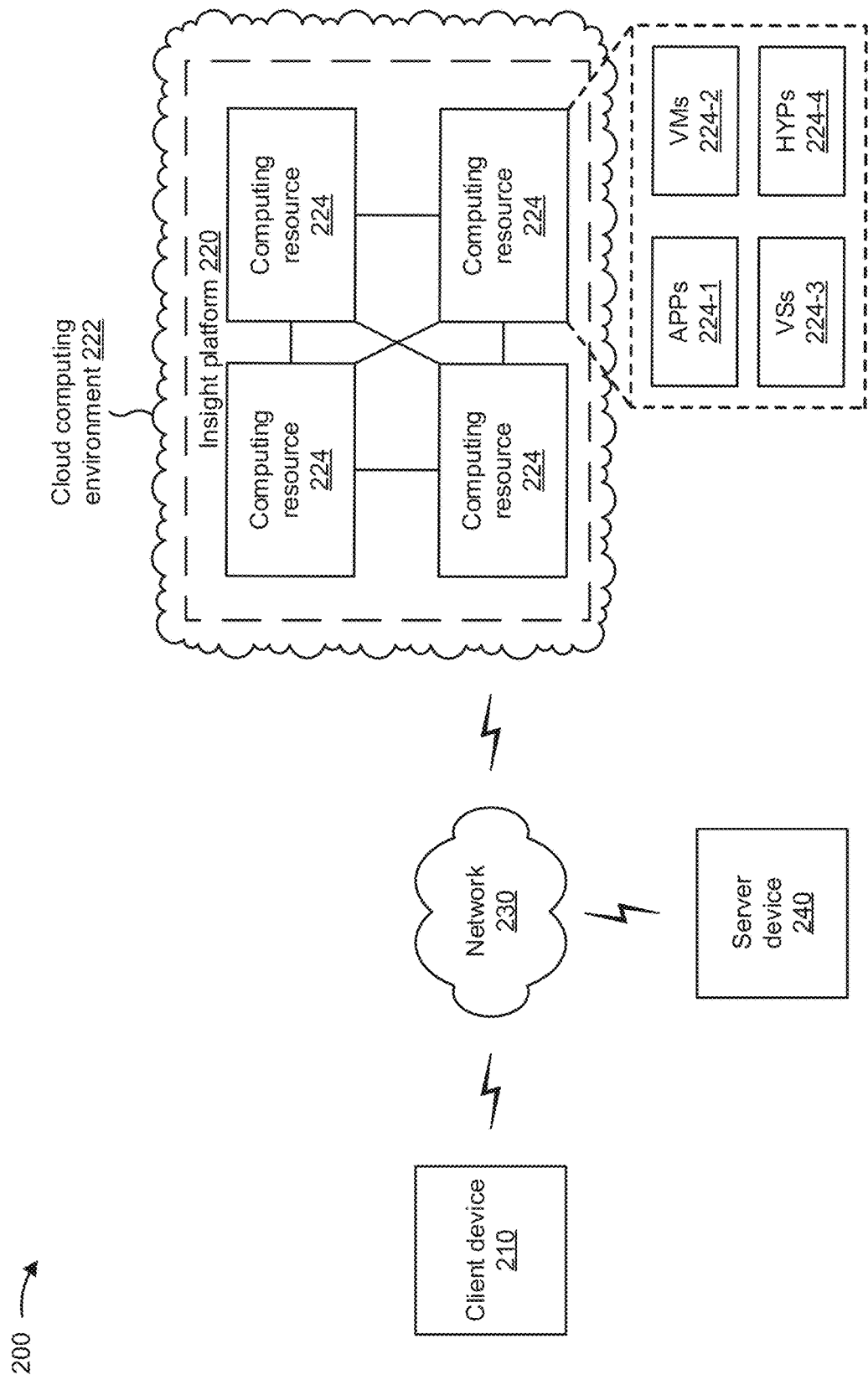
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, an insight platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to insight platform 220 and/or server device 240.

Insight platform 220 includes one or more devices that utilize machine learning models to identify insights in a document (e.g., provided by server device 240 to client device 210). In some implementations, insight platform 220 may be designed to be modular such that certain software components may be swapped in or out depending on a particular need. As such, insight platform 220 may be easily and/or quickly reconfigured for different uses. In some implementations, insight platform 220 may receive information from and/or transmit information to one or more client devices 210 and/or server devices 240.

In some implementations, as shown, insight platform 220 may be hosted in a cloud computing environment 222. Notably, while implementations described herein describe insight platform 220 as being hosted in cloud computing environment 222, in some implementations, insight platform 220 may not be cloud-based (i.e., may be implemented outside of a cloud computing environment) or may be partially cloud-based.

Cloud computing environment 222 includes an environment that hosts insight platform 220. Cloud computing environment 222 may provide computation, software, data access, storage, etc. services that do not require end-user knowledge of a physical location and configuration of system(s) and/or device(s) that hosts insight platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host insight platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210 and/or server device 240. For example, application 224-1 may include software associated with insight platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 and/or server device 240, or an operator of insight platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a server device, a group of server devices, or a similar type of device, that provides a social media application for access by client device 210. In some implementations, server device may receive information from and/or transmit information to client device 210 and/or insight platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
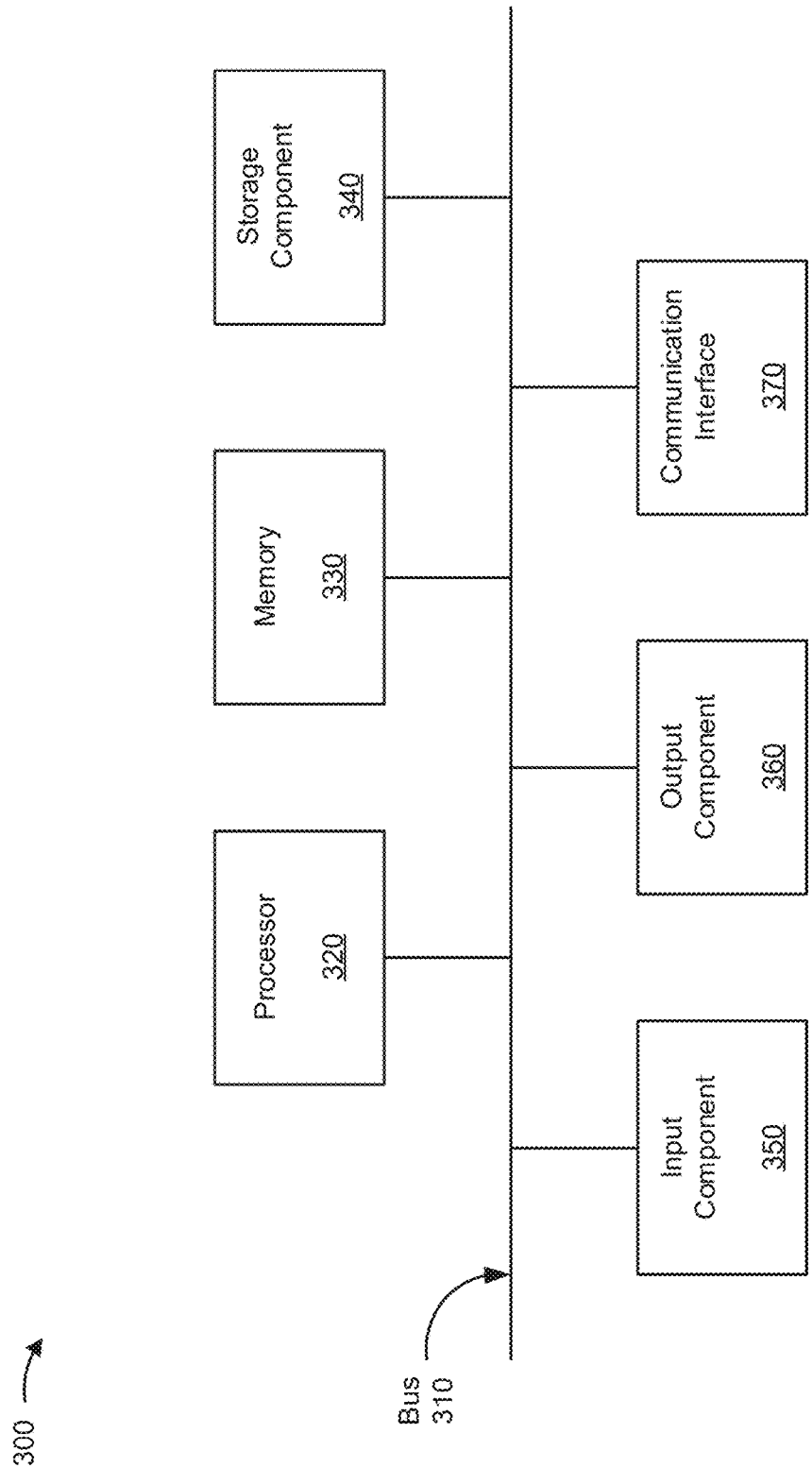
FIG. 3 is a diagram of example components of one or more devices of FIG. 2.

FIG. 3 is a diagram of example components of a device 300. Device 300 may correspond to client device 210, insight platform 220, computing resource 224, and/or server device 240. In some implementations, client device 210, insight platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing machine learning models to identify insights in a document. In some implementations, one or more process blocks of FIG. 4 may be performed by insight platform 220. In some implementations, one or more process blocks of FIG. 4 may be performed by another device or a group of devices separate from or including insight platform 220, such as client device 210 and/or server device 240.

As shown in FIG. 4, process 400 may include receiving document information and a request to identify insights in the document information (block 410). For example, insight platform 220 (e.g., via computing resource 224, processor 320, memory 330, and/or the like) may receive document information and a request to identify insights in the document information. In some implementations, server device 240 may provide document information to client device 210. In some implementations, the document information may include information associated with a document, such as textual information provided in the document, information indicating locations of the document at server device 240, information indicating folders storing information associated with the document in server device 240, information indicating files associated with document that are stored in server device 240, and/or the like.

In some implementations, client device 210 may receive the document information, and may provide a user interface that displays the document information to the user. In some implementations, the user may cause client device 210 to generate a request to identify insights in the document information. In such implementations, client device 210 may provide, to insight platform 220, the document information and the request to identify the document insights. Insight platform 220 may receive the document information and the request to identify the document insights.

In some implementations, insight platform 220 may automatically determine document insights without receiving the request to identify the document insights. For example, insight platform 220 may automatically determine the document insights based on past behavior (e.g., the user regularly asks for insights when visiting particular web pages), based on user settings (e.g., the user may set up browser settings to indicate whether to provide document insights), based on a type of document (e.g., if the document is an electronic book or a chapter of an electronic book), based on a time of day (e.g., the user may specify a particular time of day when insights are to be provided), and/or the like. In some implementations, insight platform 220 may always automatically determine the document insights so that the document insights are ready instantly if the user wants the document insights. In such implementations, insight platform 220 may store the document insights in an insight data structure (e.g., a database, a table, a linked list, and/or the like) for future use.

In some implementations, insight platform 220 may store the document information in a data structure (e.g., a database, a linked list, a tree, a table, and/or the like) associated with insight platform 220.

In this way, insight platform 220 may receive the document information and the request to identify the insights in the document information.

As further shown in FIG. 4, process 400 may include performing natural language processing on the document information to identify words, phrases, and sentences (block 420). For example, insight platform 220 (via computing resource 224, processor 320, memory 330, and/or the like) may perform natural language processing on the document information to identify words, phrases, and sentences in the document information. In some implementations, insight platform 220 may perform a natural language processing technique on the document information in order to generate a processed document. In some implementations, the natural language processing technique may convert the machine-readable and machine-storable form of the document information into a language form (e.g., the processed document) that includes recognizable words, phrases, sentences, and/or the like.

In some implementations, the natural language processing technique may include one or more of lemmatization (e.g., determining a dictionary form of a word based on the word's meaning); morphological segmentation (e.g., separating words into individual grammatical units and identifying a class of the grammatical units); part-of-speech tagging (e.g., given a sentence, determining a part of speech for each word in the sentence, such as a noun, a verb, and/or the like); parsing (e.g., determining relationships between words in a sentence and performing a grammatical analysis of the sentence); sentence breaking (e.g., given a block of text, determining sentence boundaries in the block of text based on punctuation marks); stemming (e.g., reducing inflected or derived words to their word stem, base, or root form); word segmentation (e.g., separate a block of continuous text into separate words); terminology extraction (e.g., automatically extracting relevant terms from a corpus); lexical semantics (e.g., determining a computational meaning of individual words in context); machine translation (e.g., automatically translating text from one human language to another human language); named entity recognition (e.g., given a block of text, determining which items in the text map to proper names, such as people or places, and determining a type of each proper name, such as a person, a location, an organization, and/or the like); natural language generation (e.g., converting information from machine-readable form into readable human language); natural language understanding (e.g., converting text into more formal representations, such as first-order logic structures that are easier for computer programs to manipulate); optical character recognition (e.g., determining corresponding text from an image representing printed text); question answering (e.g., determining an answer to a human-language question); recognizing textual entailment (e.g., given two text fragments, determining if one text fragment being true causes negation of the other text fragment or allows the other text fragment to be either true or false); relationship extraction (e.g., identifying relationships among named entities in text); sentiment analysis (e.g., extracting subjective information from documents to determine sentiments about specific subjects); topic segmentation and recognition (e.g., separate text into segments devoted to different topics, and identifying the topic of each segment); word sense disambiguation (e.g., selecting a meaning of a word that makes the most sense in context); coreference resolution (e.g., determining words that refer to the same objects); discourse analysis (e.g., identifying discourse structure of connected text); and/or the like.

In some implementations, insight platform 220 may identify words, phrases, and sentences in the processed document based on the natural language processing technique. For example, insight platform 220 may utilize morphological segmentation to separate words of the processed document into individual grammatical units and to identify a class of the grammatical units; part-of-speech tagging to determine a part of speech for each word in a sentence of the processed document; parsing to determine relationships between words in a sentence of the processed document and to perform a grammatical analysis of the sentence; sentence breaking to determine sentence boundaries in the processed document; word segmentation to separate a block of continuous text of the document into separate words; and/or the like.

In this way, insight platform 220 may perform the natural language processing on the document information to identify the words, the phrases, and the sentences in the document information.

As further shown in FIG. 4, process 400 may include utilizing a machine learning model to analyze the words, the phrases, and the sentences to identify abstract insights, concrete insights, and non-insights (block 430). For example, insight platform 220 (via computing resource 224, processor 320, memory 330, and/or the like) may utilize a machine learning model to analyze the words, the phrases, and the sentences to identify abstract insights, concrete insights, and non-insights. In some implementations, the machine learning model used to identify the abstract insights, the concrete insights, and the non-insights may include one or more of a decision tree learning model, a learning classifier systems model, a nearest neighbor model, a support vector machine model, a clustering model, a neural network model, a latent variable model, and/or the like.

A decision tree learning model may use a decision tree data structure to perform machine learning. A decision tree data structure classifies a population into branch-like segments that form an inverted tree with a root node, internal nodes, and leaf nodes. For example, the decision tree learning model may use a decision tree as a predictive model to map observations about an item (e.g., represented in the branches of the tree data structure) to conclusions about a target value of the item (e.g., represented in the leaves of the tree data structure). The process of building a decision tree may include partitioning the data set into subsets, shortening branches of the tree, and selecting a tree (e.g., the smallest tree) that fits the data. In some implementations, a decision tree model may be a classification tree (e.g., where the target variable can take a discrete set of values) in which leaves represent class labels and branches represent conjunctions of features that lead to those class labels. Alternatively, a decision tree model may be a regression tree (e.g., where the target variable can take continuous values, such as real numbers).

A learning classifier systems model may use learning classifier systems to perform machine learning. Learning classifier systems are a paradigm of rule-based machine learning methods that combine a discovery component (e.g. typically a genetic algorithm) with a learning component (e.g., performing either supervised learning, reinforcement learning, or unsupervised learning). Learning classifier systems seek to identify a set of context-dependent rules that collectively store and apply knowledge in a piecewise manner in order to perform functions such as classification, regression, data mining, and/or the like. Learning classifier systems allow complex solution spaces to be broken up into smaller, simpler parts.

A nearest neighbor model may use a k-nearest neighbors model to perform machine learning (e.g., pattern recognition). A k-nearest neighbors model is a non-parametric method that may be used for classification (e.g., where the output is a class membership) in which an object is classified by a majority vote of its neighbors, with the object being assigned to the class most common among its k nearest neighbors, or may be used for regression (e.g., where the output is a property value for the object) in which the value is the average of the values of its k nearest neighbors. Additionally, weights may be assigned to the contributions of the neighbors, so that the nearer neighbors contribute more to the average of the values than the more distant neighbors.

A support vector machine model may use a support vector machine (also known as a support vector network) to perform machine learning. A support vector machine is a supervised learning model with associated learning algorithms that analyze data used for classification and regression analysis. Given a set of training examples, each marked as belonging to one or the other of two categories, a support vector machine training algorithm builds a model that assigns new examples to one category or the other. A support vector machine model represents examples as points in space that are mapped so that the examples of separate categories are divided by a clear gap. New examples are then mapped into that same space and predicted to belong to a category based on which side of the gap they fall.

A clustering model may use cluster analysis (also known as clustering) to perform machine learning. Cluster analysis is the task of grouping a set of objects in such a way that objects in the same group (called a cluster) are more similar to each other than to objects in other groups. Cluster analysis can be achieved by various methods that differ significantly in their notion of what constitutes a cluster and how to efficiently find them. Different cluster models may include connectivity models (e.g., where hierarchical clustering builds models based on distance connectivity), centroid models (e.g., where the k-means algorithm represents each cluster by a single mean vector), distribution models (e.g., where clusters are modeled using statistical distributions, such as multivariate normal distributions used by the expectation-maximization algorithm), density models (e.g., where clusters are defined as connected dense regions in the data space), and/or the like.

A neural network model may use an artificial neural network to perform machine learning. An artificial neural network utilizes a collection of connected units or nodes called artificial neurons. Each connection between artificial neurons can transmit a signal from one artificial neuron to another artificial neuron. The artificial neuron that receives the signal can process the signal and then provide a signal to artificial neurons connected to it. In some artificial neural network implementations, the signal at a connection between artificial neurons may be a real number, and the output of each artificial neuron may be calculated by a non-linear function of the sum of its inputs. Artificial neurons and connections typically have a weight that adjusts as learning proceeds. The weight may increase or decrease the strength of the signal at a connection. Additionally, an artificial neuron may have a threshold such that the artificial neuron may send a signal if the aggregate signal satisfies the threshold. Artificial neurons may be organized in layers, and different layers may perform different kinds of transformations on their inputs.

A latent variable model may use latent variables (e.g., variables that are inferred rather than directly observed) to perform machine learning. A latent variable model may infer the latent variables (e.g., through a mathematical model) from other variables that are observed (e.g., directly measured). In some cases, latent variables may correspond to aspects of physical reality that can be measured, but may not be measured for practical reasons. In such cases, latent variables may be referred to as hidden variables. In other cases, latent variables may correspond to abstract concepts, such as categories, behavioral or mental states, or data structures. In such cases, latent variables may be referred to as hypothetical variables or hypothetical constructs.

In some implementations, the machine learning model may include a language streamlining function that maps each word in a sentence to a simpler, more common, or structured version of the word in a language streamlining table (e.g., a table created from a thesaurus and a dictionary).

In some implementations, the machine learning model may include a relationship type identification function that maps each of relationship located in a sentence to a relationship type from a relationship function type table (e.g., which may be provided in an insights table as a function type and a function).

In some implementations, the machine learning model may include a target and source concept identification function that identifies objects in a sentence, and groups the objects by relationship, so that a long or complex sentence with many relationships may be organized by relationship. For example, a sentence "math is a very interesting field, filled with accidental discoveries and many mysteries yet to be solved, and strongly correlates with insights from physics" may be transformed into a set of relationships: "math and field," "math and discoveries," "math and mysteries," and "math and insights from physics." Each of these relationships may be a standalone insight or may fit into a more complex insight, but may be explored individually.

In some implementations, the machine learning model may include an insight aggregation function that determines if an insight in a sentence is a standalone insight or is to be grouped with other insights in the same sentence due to having dependencies between the insights in that sentence. An example of a sentence containing a complex insight may include "True cryptography involves only a private key, a public key, the information to be kept private, and an encryption algorithm, which would ideally be collision-free." Such a sentence may be divided into a first statement (e.g., cryptography involves a private key, a public key, private information, an encryption algorithm) and a second statement (e.g., the encryption algorithm must be collision-free). The insight aggregation function may determine that there is a dependency between the two statements; that the first statement is not complete without the second statement, because the second statement contains an essential requirement for a component of the object "cryptography" in the first statement. So rather than storing the two statements as two separate insights, the two statements may be stored as one insight (e.g., "cryptography depends on a private key, a public key, private information, and a collision-free encryption algorithm").

In some implementations, the machine learning model may include a find topics function that identifies relevant topics for a particular insight, such as math, chemistry, security, and/or the like. In some implementations, the machine learning model may include a map objects function that attempts to synchronize objects that appear in a pair of insights. When the map objects function identifies a match between two objects, the map object function may attempt to match remaining unmatched objects. In some implementations, the machine learning model may include a find structural patterns function that identifies structural linguistic insight patterns, and returns a list of positive pattern matches for an insight.

In some implementations, the machine learning model may include a find semantic patterns function that identifies semantic insight patterns, and returns a list of positive pattern matches for an insight. In some implementations, the machine learning model may include a fit to network function that determines a degree to which a new insight fits in an existing abstract network, or, if the new insight does not fit in the existing network, a degree to which the existing network may be distorted in order to fit the new insight.

In some implementations, the machine learning model may include an abstractify function that takes in an abstract level and an insight as input, alters the insight to be at a specified abstraction level, and returns a new more abstract version of the insight, at the specified level of abstraction. The abstractify function may use the language streamlining table to determine a synonym of each word in an insight that is at the specified level of abstraction.

In some implementations, the machine learning model may include a uniqueness function that graphs relationships between two objects as a vector, where a vector direction indicates a causal property of the relationship, and a shape of the vector indicates a type of relationship function linking the two objects (e.g., concepts). For example, the uniqueness function may graph an existing insight "security by obscurity is sub-optimal" as a link between objects "security" and "obscurity" in the graph, and a vector linking the objects would include a shape indicating a sub-optimal relationship function type. The uniqueness function may receive a new insight (e.g., possibly from an article explaining basic security concepts: "cryptography depends on a private key, a public key, private information, and a collision-free encryption algorithm"), and may map concepts (e.g., private key, public key, private information, and encryption algorithm) on the graph of objects. The uniqueness function may graph vectors between concepts (e.g., four vectors from each of the concepts, and another vector leading to "security"). The uniqueness function may provide two graphed insights (e.g., one for the "security by obscurity" insight, and another for the "cryptography" insight), and both insights may have one node in common (e.g., "security"). The uniqueness function may evaluate the two insights at the same abstraction level, but the "security by obscurity" insight is at a higher abstraction level than the "cryptography" insight, a "private key" is a concrete object, and "obscurity" is an abstract concept. The machine learning model may determine which insight is less abstract, using an abstract level function, may convert less abstract insight into a more abstract version using the abstractify function, and may re-compare the two insights. The uniqueness function may determine when a sentence equals another sentence which, at first, might seem very different.

In some implementations, the machine learning model may include a newness function that evaluates whether an insight is new, as opposed to being considered common knowledge. In some implementations, the machine learning model may include a truth function that evaluates an insight for truth. The truth function may compare the insight to known insight structural and semantic patterns, known facts, known insights, and may determine whether the insight fits into a cohesive concept network, or whether the insight requires a drastic distortion of the network to fit in. A drastic distortion may indicate that the insight is either not true or invalidates a drastic degree of what we assumed to be true. The cohesive concept network is called an abstract network, and links all abstract concepts. The insight needs to fit into the concept network in such a way that it does not require drastically distorting existing interactions of the concept network, and does not contradict another known insight.

In some implementations, the machine learning model may include an obviousness function that evaluates whether an insight is obvious, based on a significance of a time required to intuit the insight. An intuition time of an insight may be similar to computational complexity of an algorithm, and may be determined by identifying sub-insight logical steps to arrive at an insight conclusion, calculating a thinking time required for each sub-step, and summing the thinking times of the sub-steps to estimate the intuition time.

In some implementations, the machine learning model may include an abstract level function that identifies an abstract level of a concept or insight based on a scale (e.g., of zero, indicating concrete, physical objects, to ten, indicating an abstract concept). In some implementations, the machine learning model may include a structural insight pattern identification function that identifies structural insight patterns in an insight. In some implementations, the machine learning model may include a semantic insight pattern identification function that identifies semantic insight patterns in an insight. In some implementations, the machine learning model may include an assessing insight probability function that returns a Boolean true or false value based on whether a sentence is an insight.

In this way, insight platform 220 may utilize the machine learning model to analyze the words, the phrases, and the sentences to identify the abstract insights, the concrete insights, and the non-insights.

As further shown in FIG. 4, process 400 may include utilizing a machine learning model to match the abstract insights with particular concrete insights (block 440). For example, insight platform 220 (via computing resource 224, processor 320, memory 330, and/or the like) may utilize a machine learning model to match the abstract insights with particular concrete insights. In some implementations, insight platform 220 may be associated with a repository that includes concrete insights related to a variety of concepts. Insight platform 220 may utilize the machine learning model to compare the abstract insights with the concrete insights provided in the repository, and to match the abstract insights with the particular concrete insights provided in the repository.

In some implementations, the machine learning model, used to match the abstract insights with the particular concrete insights, may include one or more of a decision tree learning model, a learning classifier systems model, a nearest neighbor model, a support vector machine model, a clustering model, a neural network model, a latent variable model, and/or the like, described elsewhere herein.

In this way, insight platform 220 may utilize the machine learning model to match the abstract insights with the particular concrete insights.

As further shown in FIG. 4, process 400 may include utilizing a machine learning model to determine particular insights based on the non-insights (block 450). For example, insight platform 220 (via computing resource 224, processor 320, memory 330, and/or the like) may utilize a machine learning model to determine particular insights based on the non-insights. In some implementations, insight platform 220 may be associated with a repository that includes insights related to a variety of concepts. The insight platform may utilize the machine learning model to compare the non-insights with the insights provided in the repository, and to match the non-insights with the particular insights provided in the repository.

In some implementations, the machine learning model used to determine the particular insights based on the non-insights may include one or more of a decision tree learning model, a learning classifier systems model, a nearest neighbor model, a support vector machine model, a clustering model, a neural network model, a latent variable model, and/or the like, described elsewhere herein.

In this way, insight platform 220 may utilize the machine learning model to determine the particular insights based on the non-insights.

As further shown in FIG. 4, process 400 may include generating an insight document that includes the concrete insights, the abstract insights matched with the particular concrete insights, and the particular insights determined based on the non-insights (block 460). For example, insight platform 220 (via computing resource 224, processor 320, memory 330, and/or the like) may generate an insight document that includes the concrete insights, the abstract insights matched with the particular concrete insights, and the particular insights determined based on the non-insights. In some implementations, insight platform 220 may create the insight document based on the concrete insights, the abstract insights matched with the particular concrete insights, and the particular insights determined based on the non-insights. In some implementations, insight platform 220 may combine the concrete insights, the abstract insights matched with the particular concrete insights, and the particular insights determined based on the non-insights in a manner such that the concrete insights, the abstract insights matched with the particular concrete insights, and the particular insights determined based on the non-insights that are related to a particular concept are grouped together in the insight document.

Alternatively, or additionally, insight platform 220 may emphasize (e.g., via highlighting, via bold text, via italics text, via bold and italics text, via color coding, and/or the like) the concrete insights, the abstract insights matched with the particular concrete insights, and the particular insights determined based on the non-insights in the processed document (e.g., as shown in FIG. 1B) to generate an insight-emphasized document. In such implementations, since the particular concrete insights and the particular insights are not part of the processed document, insight platform 220 may add particular concrete insights and the particular insights to the processed document, and may emphasize the particular concrete insights and the particular insights. The insight-emphasized document may enable a reader of the insight-emphasized document to quickly and easily locate the insights in the original document.

In some implementations, insight platform 220 may assign scores to the concrete insights, the abstract insights matched with the particular concrete insights, and the particular insights determined based on the non-insights, based on likelihoods of being true. In such implementations, insight platform 220 may rank the concrete insights, the abstract insights matched with the particular concrete insights, and the particular insights determined based on the non-insights, based on the scores, to generate a ranked list of insights, and may include the ranked list of insights in the insight document.

In this way, insight platform 220 may generate the insight document that includes the concrete insights, the abstract insights matched with the particular concrete insights, and the particular insights determined based on the non-insights.

As further shown in FIG. 4, process 400 may include determining recommended documents based on the insight document, and providing the insight document and the recommended documents for display (block 470). For example, insight platform 220 (via computing resource 224, processor 320, memory 330, and/or the like) may determine recommended documents based on the insight document, and may provide the insight document and the recommended documents for display. In some implementations, insight platform 220 may be associated with a document repository that includes documents related to a variety of concepts. In such implementations, insight platform 220 may compare the information provided in the insight document with the documents provided in the document repository, and may match the information provided in the insight document with particular documents (e.g., recommended documents) provided in the document repository.

In some implementations, insight platform 220 may provide the insight document (e.g., or the insight-emphasized document) and information identifying the recommended documents to client device 210. Client device 210 may receive the insight document, and may provide the insight document for display to the user via a user interface. Client device 210 may receive the information identifying the recommended documents, and may provide the information identifying the recommended documents for display to the user via the user interface providing the insight document, or via a separate user interface.

In this way, insight platform 220 may determine the recommended documents based on the insight document, and may provide the insight document and the recommended documents for display.

In some implementations, before utilizing the machine learning models described herein, insight platform 220 may train the machine learning models. In such implementations, insight platform 220 may utilize historical information to train the machine learning models, and to generate trained machine learning models. For example, insight platform may train a machine learning models by providing the historical information (e.g., training data) to the machine learning model, and receiving predictions (e.g., indicating whether a document includes concepts, abstract insights, concrete insights, non-insights, and/or the like) based on providing the historical information to the machine learning model. Based on the predictions, insight platform 220 may update the machine learning model, and may provide the historical information to the updated machine learning model. Insight platform 220 may repeat this process until correct predictions are generated by the machine learning model. In some implementations, the historical information may include information associated with concepts included in documents, abstract insights included in documents, concrete insights included in documents, non-insights included in documents, and/or the like.

In some implementations, an insight may include a relationship function between two or more objects. The objects may include abstract concepts (e.g., finance, games, or truth), but may include concrete concepts (e.g., real, easily measured and detailed objects, such a dollar). For example, a relationship function may include a verb (e.g., "a computer is like a brain"), figurative language (e.g., metaphors, such as "a computer is like a brain"), and adjectives (e.g., "a computer is primarily like a brain but structurally similar to evolution").

In some implementations, an insight may be abstract (e.g., "the arc of the moral universe is long, but it bends toward justice" or concrete (e.g., "global GDP is directly related to tech progress"). In some implementations, insights may include facts that are insightful because they reveal deeper rules that we can eventually use to derive facts (e.g., the insight "global GDP is directly related to tech progress" is a fact that reveals a deeper, more abstract and insightful rule, such as "when tech is prioritized first, cascading cross-domain solutions follow").

In some implementations, insights may include interactions between objects, but not every interaction between objects is an insight (e.g., saying "if you go over the edge of a waterfall, you'll be in danger" is an interaction between objects, but it is not insightful because it is obvious to everyone who understands gravity). In some implementations, an insight cannot be obvious, and an insight cannot be common knowledge. In some implementations, insights may be unique, and may advance human knowledge or technological progress in some way.

In some implementations, insights may be declarative sentences (e.g., "x is definitely a"), but may be embedded in questions ("is x a?") or speculative sentences ("x could be a"). In some implementations, an insight may follow certain structural patterns common to other insights since certain relationship types are newer and may appear more often in insights. In some implementations, an insight may relate to concepts that are not perfectly understood (e.g., many things about chemistry, physics, and math are unknown, so insights are likelier to relate to objects in these fields). In some implementations, insights may relate to complex concepts that appear more often in soft sciences, such as economics, law, and psychology. In some implementations, there may be insight trajectory patterns across different fields.

In some implementations, insight platform 220 may automatically analyze published content (e.g., without being requested to analyze the published content) to identify insights, and may create an insight data structure (e.g., a database, a table, a linked list, and/or the like) with the identified insights.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein may provide an insight platform that utilizes machine learning models to identify insights in a document. For example, the insight platform may receive document information associated with a document, and may receive a request to identify insights in the document information. The insight platform may perform natural language processing on the document information to identify words, phrases, and sentences, and may utilize a first machine learning model with the words, the phrases, and the sentences to identify abstract insights, concrete insights, and non-insights. The insight platform may utilize a second machine learning model to match the abstract insights with particular concrete insights, and may utilize a third machine learning model to determine particular insights based on the non-insights. The insight platform may generate an insight document that includes the concrete insights, the abstract insights matched with the particular concrete insights, and the particular insights determined based on the non-insights. The insight platform may determine recommended documents based on the insight document, and may provide the insight document and the recommended documents for display.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
    training, by a device, a machine learning model by:
        providing historical information to the machine learning model,
        receiving, from the machine learning model, prediction information based on providing the historical information to the machine learning model, and
        updating the machine learning model based on the prediction information;
    utilizing, by the device, the trained machine learning model on a document to:
        identify information indicating an abstract insight, a first concrete insight, and a non-insight in the document,
            wherein the abstract insight is one or more of:
                an insight that is not based on reality, a specific object, or an actual instance,
                an insight that expresses a quality or characteristic apart from a specific object or an actual instance, or
                a theoretical insight;
            wherein the first concrete insight is one or more of:
                an insight that is based on reality, a specific object, or an actual instance,
                an insight pertaining to reality or an actual instance, or
                an insight applied to an actual substance or thing, and
            wherein the non-insight is one or more of:
                an opinion,
                a fact, or
                a guess,
        match the abstract insight with a second concrete insight that is different than the first concrete insight and the abstract insight, and
        match the non-insight with a stored insight that is different from insights identified in the document;

generating, by the device, an insight document by combining the first concrete insight, the abstract insight, and the stored insight; and providing, by the device and for display, the insight document.

2. The method of claim 1, further comprising:

performing natural language processing on the document; and wherein utilizing the trained machine learning model on the document comprises:

utilizing the trained machine learning model on the document based on performing the natural language processing on the document.

3. The method of claim 1, further comprising:

utilizing a data cleansing method to filter one or more portions of the document; and wherein utilizing the trained machine learning model on the document comprises:

utilizing the trained machine learning model on the document based on filtering the one or more portions of the document.

4. The method of claim 1, wherein the second concrete insight is provided in a repository.

5. The method of claim 1, wherein the stored insight is provided in a repository.

6. The method of claim 1, further comprising:

matching the insight document with one or more other documents.

7. The method of claim 6, further comprising:

providing the one or more other documents to another device.

8. A device, comprising:

one or more memories; and one or more processors, coupled to the one or more memories, configured to:

provide historical information to a machine learning model;

receive, from the machine learning model, prediction information based on providing the historical information to the machine learning model;

update the machine learning model based on the prediction information;

utilize the updated machine learning model on a document to:

identify information indicating an abstract insight, a first concrete insight, and a non-insight in the document, wherein the abstract insight is one or more of:

an insight that is not based on reality, a specific object, or an actual instance, an insight that expresses a quality or characteristic apart from a specific object or an actual instance, or a theoretical insight;

wherein the first concrete insight is one or more of:

an insight that is based on reality, a specific object, or an actual instance, an insight pertaining to reality or an actual instance, or an insight applied to an actual substance or thing, and wherein the non-insight is one or more of:

an opinion, a fact, or a guess, match the abstract insight with a second concrete insight that is different than the first concrete insight and the abstract insight, and match the non-insight with a stored insight that is different from insights identified in the document;

generate an insight document by combining the first concrete insight, the abstract insight, and the stored insight; and provide, for display, the insight information.

9. The device of claim 8, wherein the one or more processors are further configured to:

perform a natural language processing technique on the document; and wherein the one or more processors, to utilize the updated machine learning model on the document, are configured to:

utilize the updated machine learning model on the document based on performing the natural language processing technique on the document.

10. The device of claim 8, wherein the one or more processors are further configured to:

filter one or more portions of the document utilizing a data cleansing method; and wherein the one or more processors, to utilize the updated machine learning model on the document, are configured to:

utilize the updated machine learning model on the document based on filtering the one or more portions of the document.

11. The device of claim 8, wherein the second concrete insight is provided in a repository.

12. The device of claim 8, wherein the stored insight is provided in a repository.

13. The device of claim 8, wherein the one or more processors are further configured to:

match the insight document with one or more other documents provided in a repository.

14. The device of claim 13, wherein the one or more processors are further configured to:

provide the one or more other documents to a client device.

15. A non-transitory computer-readable medium storing a set of instructions, the set of instructions comprising:

one or more instructions that, when executed by one or more processors of a device, cause the device to:

provide historical information to a machine learning model;

receive, from the machine learning model, prediction information based on providing the historical information to the machine learning model;

update the machine learning model based on the prediction information;

identify, utilizing the updated machine learning model, information indicating an abstract insight, a first concrete insight, and a non-insight in a document, wherein the abstract insight is one or more of:

an insight that is not based on reality, a specific object, or an actual instance, an insight that expresses a quality or characteristic apart from a specific object or an actual instance, or a theoretical insight;

wherein the first concrete insight is one or more of:

an insight that is based on reality, a specific object, or an actual instance, an insight pertaining to reality or an actual instance, or an insight applied to an actual substance or thing, and wherein the non-insight is one or more of:
an opinion,
a fact, or
a guess;

match, utilizing the updated machine learning model, the abstract insight with a second concrete insight that is different than the first concrete insight and the abstract insight, and match, utilizing the updated machine learning model, the non-insight with a stored insight that is different from insights identified in the document;

generate an insight document by combining the first concrete insight, the abstract insight, and the stored insight; and provide, for display, the insight document.

16. The non-transitory computer-readable medium of claim 15, wherein the one or more instructions further cause the device to:

perform natural language processing on the document; and wherein the one or more instructions, that cause the device to identify the information indicating the abstract insight, the first concrete insight, and the non-insight in the document, cause the device to:

identify the information indicating the abstract insight, the first concrete insight, and the non-insight in the document based on performing the natural language processing on the document.

17. The non-transitory computer-readable medium of claim 15, wherein the one or more instructions further cause the device to:

filter one or more portions of the document utilizing a data cleansing method; and wherein the one or more instructions, that cause the device to identify the information indicating the abstract insight, the first concrete insight, and the non-insight in the document, cause the device to:

identify the information indicating the abstract insight, the first concrete insight, and the non-insight in the document based on filtering the one or more portions of the document.

18. The non-transitory computer-readable medium of claim 15, wherein the second concrete insight is provided in a repository.

19. The non-transitory computer-readable medium of claim 15, wherein the stored insight is provided in a repository.

20. The non-transitory computer-readable medium of claim 15, wherein the one or more instructions further cause the device to:

match the insight document with one or more other documents; and provide the one or more other documents to another device.

\* \* \* \* \*